T. C. VAN EPPS.
SELF TIGHTENING BALL AND SOCKET PIPE JOINT.
APPLICATION FILED SEPT. 21, 1916.
1,223,645.
Patented Apr. 24, 1917.
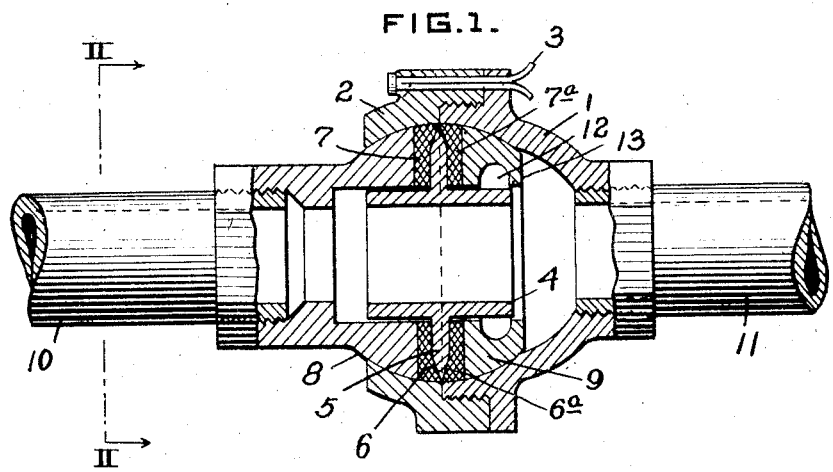
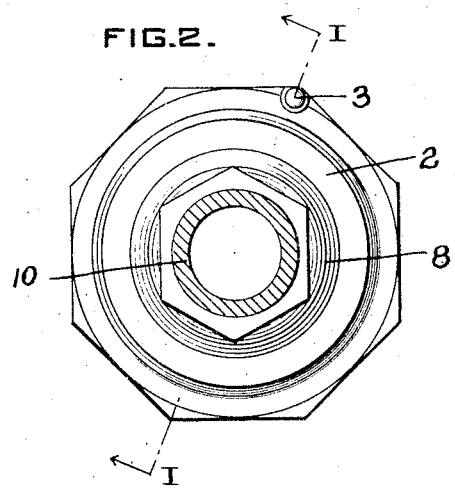
WITNESSES
J. Herbert Bradley.
Paul M. Critchlow
INVENTOR
Theodore C. Van Epps,
by Christy & Christy
Attys

UNITED STATES PATENT OFFICE.

THEODORE C. VAN EPPS, OF LOS ANGELES, CALIFORNIA.

SELF-TIGHTENING BALL-AND-SOCKET PIPE-JOINT.

1,223,645.  Specification of Letters Patent.  Patented Apr. 24, 1917.

Application filed September 21, 1916. Serial No. 121,415.

*To all whom it may concern:*

Be it known that I, THEODORE C. VAN EPPS, residing at Los Angeles, in the county of Los Angeles and State of California, a citizen of the United States, have invented or discovered certain new and useful Improvements in Self-Tightening Ball-and-Socket Pipe-Joints, of which improvements the following is a specification.

The object of the invention described herein is to provide a simple and efficient universal self-tightening ball-and-socket pipe joint which may be easily assembled and readily taken apart for the renewal of packing.

A further object of the invention is to provide a joint of the character described having a pair of separated compressible packing rings.

The invention is illustrated in the accompanying sheet of drawings of which Figure 1 is a central longitudinal section of the pipe joint, the plane of view being indicated by the line I—I, Fig. 2, and Fig. 2 is an end view taken on the line II—II, Fig. 1.

The ball-and-socket joint constructed according to the present invention comprises a socket member and a ball member each adapted to be connected to a pipe. The socket member is preferably formed of two parts, a shell 1 and a collar 2 having screw-thread attachment to each other and provided interiorly with a spherical surface. Portions of the outer faces of both of these members are hexagonal, as seen in Fig. 2, so that they may be engaged by a wrench, and the flanges forming the wrench-engaging faces are provided with registering holes to receive a cotter pin 3 for locking the member in closed position. For attaching the socket to a pipe 11 the outer end of the shell 1 is screw-threaded interiorly.

The ball member comprises first a central cylindrical sleeve 4, provided medially with a disk 5, which extends to the inner surface of the socket member, and which has beveled or converging faces 6 and 6ª at its periphery. Surrounding the sleeve there is a pair of compressible packing rings 7 and 7ª, one being placed on each side of the disk 5 and extending from the sleeve to the inner face of the socket. These rings are, as indicated, beveled or enlarged at their peripheries to conform to the beveled edges of the disk 5, thereby affording a large surface area of contact with the socket. Surrounding the ends of the sleeve 4, and telescoping with the outer faces thereof, are packing-compressing rings 8 and 9. Each of these rings preferably have spherically shaped outer surfaces. That the ball member may be attached to a pipe 10, its outer end is screw-threaded interiorly. The ring 9 is cored as at 12 to lighten its weight, and is provided with a flat face 13 so that the pressure of the fluid within or passing through the joint may hold the several parts of the joint under compression to press the packing rings outwardly.

It will be understood that by the use of two packing rings, arranged as shown and described, a maximum surface area of packing contact may be obtained, and that, in case one packing ring is defective, the other may serve to prevent leakage. Furthermore, these advantages are obtained in a joint that may be easily assembled and readily taken apart for repair, and which in operation is self-tightening.

According to the provisions of the patent statutes I have described the principle and operation of my invention, together with the joint which I now consider to represent the best embodiment thereof. However, I desire to have it understood that my invention may be practised with other forms of construction than that specifically shown and described.

I claim as my invention:

1. In a self-tightening universal ball-and-socket pipe joint the combination with a two-part socket member one part of which is provided with means for attaching it to a pipe; of a ball member within said socket and comprising a central sleeve provided medially with a laterally extending disk, a pair of compressible packing rings surrounding said sleeve and disposed one on each side of said disk, and a pair of centrally bored packing-compressing rings each telescoping with one end of said sleeve and freely slidable longitudinally thereon to tighten said packing rings, one of said packing-compressing rings being provided with means for attaching it to a pipe and the other being provided with a face exposed to fluid pressure.

2. In a self-tightening universal ball-and-socket pipe joint, the combination with a two-part socket member one part of which is provided with means for attaching it to a pipe, of a ball member within said socket and comprising a central sleeve provided medially with a laterally extending disk beveled on each side at its periphery, a pair of compressible packing rings surrounding said sleeve and disposed one on each side of said disk, said rings being beveled outwardly at their peripheries to conform to the bevel of said disk, and a pair of centrally bored packing-compressing rings each telescoping with one end of said sleeve and freely slidable longitudinally thereon to tighten said packing rings, one of said packing-compressing rings being provided with means for attaching it to a pipe and the other being provided with a face exposed to fluid pressure.

3. In a self-tightening universal ball-and-socket pipe joint, the combination of a two-part socket member having a spherical inner face, one part of the socket being provided with means for attaching it to a pipe; of a ball member within said socket and comprising a central cylindrical sleeve provided medially with a laterally projecting disk extending to the inner face of the socket member, the sides of said disk at the periphery thereof being beveled toward each other, a pair of compressible packing rings surrounding said sleeve and disposed one on each side of the disk, said rings being beveled outwardly at their peripheries to conform to the bevel of said disk, and a pair of centrally bored packing-compressing rings each telescoping with the outer face of one end of said sleeve and freely slidable longitudinally thereon to tighten said packing rings, the outer faces of said packing-compressing rings being sections of spheres, one of said rings being provided with means for attaching it to a pipe and the other being provided with a face exposed to fluid pressure.

In testimony whereof I have hereunto set my hand.

THEODORE C. VAN EPPS.

Witnesses:
 PAUL N. CRITCHLOW,
 FRANCIS J. TOMASSON.